Sept. 2, 1958 — A. G. DISEKER — 2,849,982
POULTRY FEEDER
Filed Feb. 20, 1956 — 2 Sheets-Sheet 1
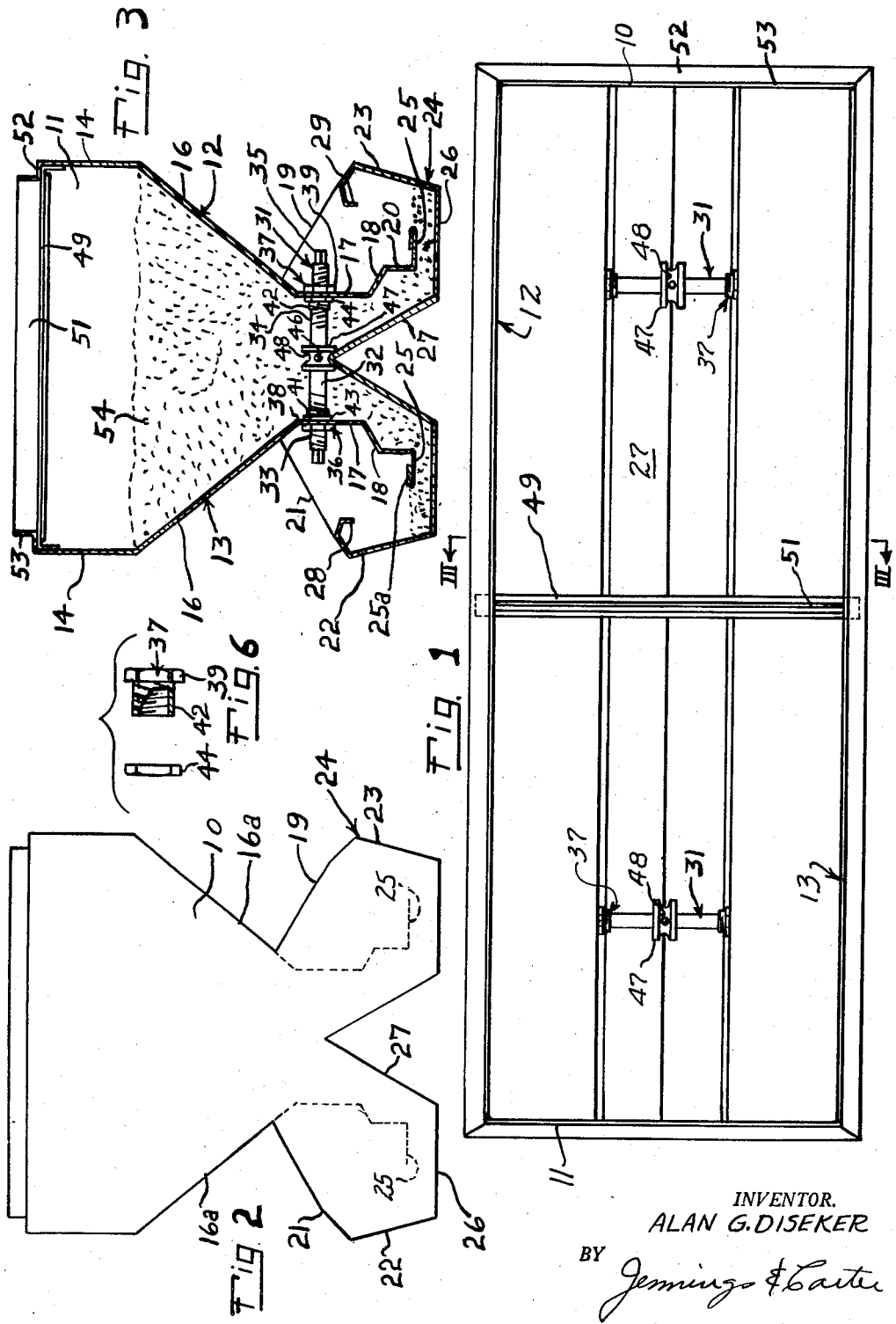
INVENTOR.
ALAN G. DISEKER
BY Jennings & Carter
ATTORNEYS Sept. 2, 1958     A. G. DISEKER     2,849,982
POULTRY FEEDER
Filed Feb. 20, 1956     2 Sheets-Sheet 2
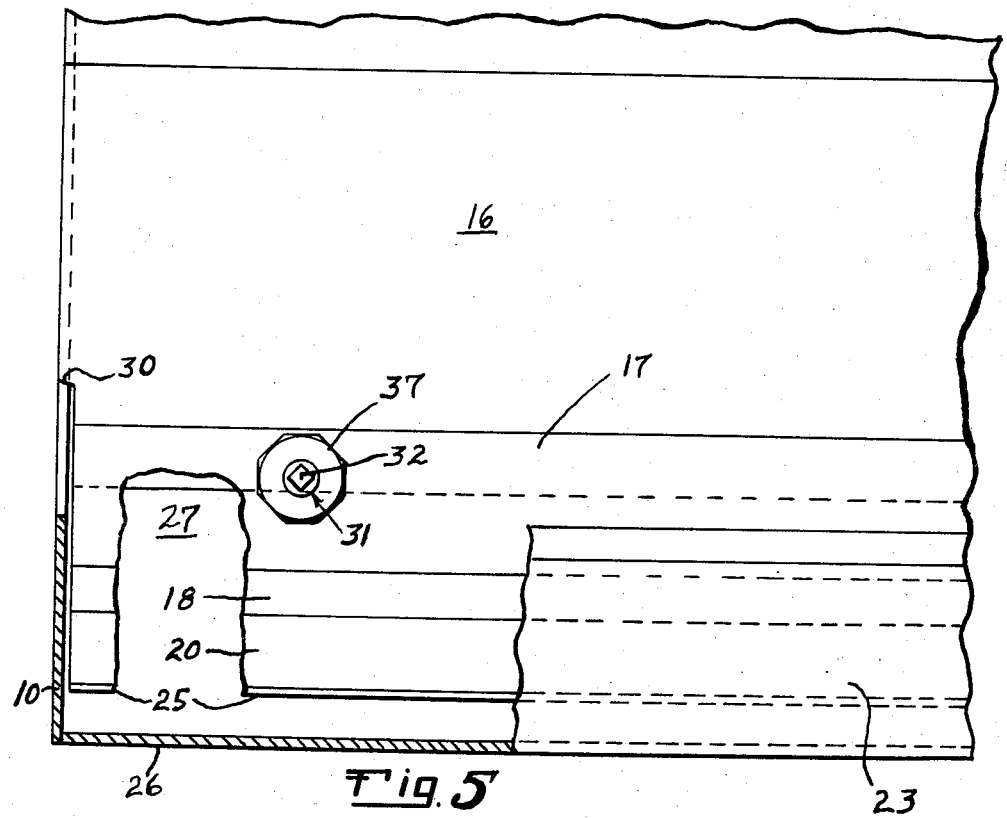
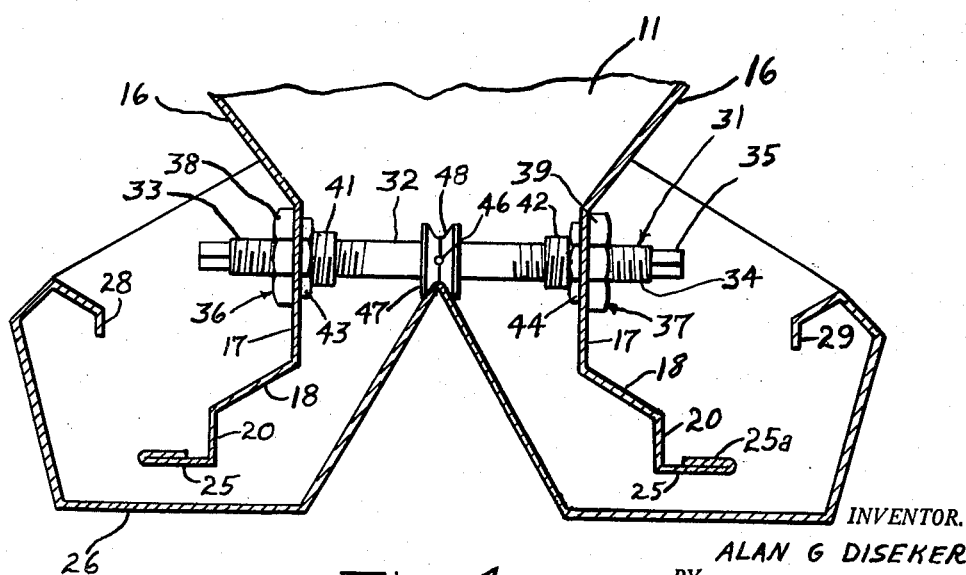
INVENTOR.
ALAN G DISEKER
BY
*Jennings & Carter*
ATTORNEYS 2,849,982

POULTRY FEEDER

Alan G. Diseker, Decatur, Ala.

Application February 20, 1956, Serial No. 566,463

1 Claim. (Cl. 119—53)

This invention relates to a poultry feeder and is an improvement over that described and claimed in my copending application Serial No. 386,687 filed October 19, 1953 and entitled Poultry Feeder, which issued as Patent No. 2,735,401 on February 21, 1956.

An object of my invention is to provide a poultry feeder having a hopper and feed trough construction which shall embody improved means for maintaining even gravity flow of feed from the hopper unit and means for distributing the feed evenly into the trough.

Another object of my invention is to provide a poultry feeder of the character designated which shall include improved means preventing excess feed from entering the feed trough, thereby eliminating waste of feed.

Another object of my invention is to provide a poultry feeder of the character designated which shall include means for varying the distance between the side walls of the hopper adjacent the discharge end thereof, whereby the hopper is adapted for discharging feeds having different consistencies.

A further object of my invention is to provide a poultry feeder having a hopper and feed trough construction which permits the feed to be discharged wholly independent of the action of the bird feeding therefrom.

A still further object of my invention is to provide a poultry feeder of the character designated which shall be sturdy of construction, economical of manufacture and one which readily lends itself to mass production.

Heretofore in the art to which my invention relates difficulties have been encountered in the construction of gravity flow poultry feeders due to the fact that no effective means has been provided for controlling the flow of feed. That is, the feed flows into the trough in excess of that required and as long as the birds disturb or agitate the feed it continues to flow. Also, due to the fact that the consistency of poultry feed varies, a feeder adapted for use with one feed will be unsatisfactory for another.

To overcome these and other difficulties, I have devised a poultry feeder which comprises an open top hopper unit having downwardly converging side walls and a feed trough positioned beneath the hopper. Means is provided for varying the distance between the side walls of the hopper adjacent the discharge ends thereof, whereby the hopper is adapted for use with feeds of different consistencies. The lower edges of the hopper side walls terminate in outwardly extending flanges which provide even distribution of the feed in the feed trough and prevent the birds from disturbing or agitating the feed while it is moving in a downward direction by gravity.

A feeder embodying features of my invention is shown in the accompanying drawing forming a part of this application, in which:

Fig. 1 is a plan view;

Fig. 2 is an end view;

Fig. 3 is a sectional view taken generally along the line III—III of Fig. 1;

Fig. 4 is an enlarged vertical sectional view, partly broken away;

Fig. 5 is a fragmental view, partly broken away and in section, showing one end of the feeder; and, Fig. 6 is an exploded view, partly in section, showing the nuts for receiving the supporting bolts.

Referring now to the drawings for a better understanding of my invention, I show a hopper unit formed of relatively thin sheet material and embodying end walls 10 and 11 and side walls 12 and 13. I find that cold rolled sheet metal on the order of 26 gauge is satisfactory in every respect for the construction of my feeder. The side walls have vertically extending upper portions 14, downwardly converging portions 16 and vertically extending lower portions 17 having outwardly and downwardly flaring lips 18. Formed integrally with the lower edges of the lips 18 is a vertical portion 20 which terminates in a generally horizontally disposed outturned flange 25. To add strength to the flange 25, the sheet material is bent over on itself as at 25a.

The end walls 10 and 11 have downwardly converging edge portions 16a and outwardly flaring edge portions 19 and 21 which terminate in downwardly and inwardly extending portions which form the end walls of a feed trough 24. The trough 24 has side walls 22 and 23 and a bottom wall 26. The upper portions of the side walls of the trough 24 are joined to the end walls 10 and 11 by any suitable means. As shown in Fig. 5, the lower portions of the side walls 12 and 13 are detached from the ends 10 and 11 as at 30, whereby they are capable of flexing movement inwardly and outwardly of the trough.

The bottom of the trough is provided with a centrally disposed, longitudinally extending raised portion in the form of an inverted V-shaped ridge 27 which extends upwardly between the lower vertical portions 17 of the hopper. The upper ends of the side walls 22 and 23 of the trough extend inwardly and downwardly as at 28 and 29, respectively, thus preventing waste of feed and providing a scraping surface against which the underside of the beaks of the birds may be scraped as they withdraw their heads from the feed trough.

Horizontal support members 31 pass over the ridge 27 at spaced intervals and are attached to the vertical portions 17 of the side walls, thus providing a rigid construction and permitting the hopper to be supported along the length thereof. The support members 31 are in the form of bolts 32 having oppositely threaded sections 33 and 34 on their ends which pass through suitable openings in the vertical portions 17 of the hopper side walls. Nuts 36 and 37 are mounted on the threaded sections 33 and 34, respectively. The nuts 36 and 37 are provided with enlarged portions 38 and 39 which engage the outer surface of the vertical portions 17 and externally threaded reduced portions 41 and 42 which extend inwardly through the openings in the vertical portions 17. Nuts 43 and 44 are in threaded engagement with the reduced portions 41 and 42, respectively in position to engage the inner surface of the vertical portions 17, thereby locking the nuts 36 and 37 rigidly to the side walls of the hopper.

Mounted on the central portion of the bolt 32 by means of a set screw 46 is a collar 47 having a groove 48 therein disposed to receive the upper edge of the ridge 27 whereby the bolt is held against axial shifting while it is being rotated. The outer ends of the bolt 32 are preferably polygonal in shape as at 35 for receiving a suitable actuating tool whereby the bolt may be rotated relative to the nuts 36 and 37.

To add further strength to the feeder, a laterally extending brace member 49 connects the upper edges of the side walls 12 and 13. The brace member 49 is provided with an upstanding flange 51. Also, the upper end of the hopper unit is turned inwardly as at 52 and upwardly as at 53 to provide a relatively sharp upper edge which prevents birds from resting on top of the feeder and thereby contaminating the feed therein.

From the foregoing description the use of my improved poultry feeder will be readily understood. The feed indicated at 54 is placed in the hopper where it flows, by gravity, downwardly between the ridge 27 and the vertical portions 17 of the hopper and thence beneath the horizontal flanges 25 into the feed trough 24. By turning the bolt 32 the lower, flexible ends of the side walls 12 and 13 can be moved toward and away from the ridge 27 thereby varying the width of the openings defined between the lower wall sections and the ridge 27. As the bolt 32 is rotated, the ridge 27 engages the groove 48 in the collar 47, thus preventing axial shifting of the bolt 32 while it is being rotated by a suitable tool, such as a crank, wrench or the like. The outwardly and downwardly flaring lips 18 at the bottom of the hopper, together with the vertical portions 20 and the outturned flanges 25 cause the feed to flow evenly into the trough.

From the foregoing it will be seen that I have devised an improved poultry feeder which provides even and controlled flow of the feed, thereby preventing waste and contamination of the feed. By providing means for varying the distance between the ridge 27 and the lower sections of the hopper, the feeder is particularly adapted for use with feeds having various consistencies. Also, by providing the outturned horizontal flanges at the lower end of the hopper, the feed moves in a substantially horizontal plane adjacent the feed area of the trough. Accordingly, the birds do not contact the feed as it is moving downward. In actual practice, I have found that, with conventional type feeders, birds will continue to peck at the feed as long as they see the particles of feed move downward, even though they do not eat the same. Furthermore, by providing bolts which are operatively connected to the side walls of the hopper and which are supported by the upstanding ridge, the bolts serve both as support means for the hopper and means for varying the distance between the lower sections of the hopper and the upstanding ridge.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth in the appended claim.

What I claim is:

In a poultry feeder, an open top feed hopper having end walls and side walls with downwardly converging sections connected to the end walls, a feed trough beneath said hopper and communicating therewith, lower sections on said side walls detached from the end walls and capable of flexing movement inwardly and outwardly of the trough, a longitudinally extending raised portion in the bottom of the trough between the lower sections of the side walls defining with said side walls spaces along each side of the feeder through which feed may flow as it is consumed from the trough, a rigid cross member resting on the top of the raised portion, right and left hand threaded sections on the ends of the cross member in threaded engagement with the lower sections of said side walls, means on the cross member coacting with the top of the raised portion to hold the cross member against axial shifting, and means on the cross member providing a tool seat for rotating the cross member thereby to regulate the size of said spaces through which feed may flow.

References Cited in the file of this patent

UNITED STATES PATENTS

| 1,509,433 | Knilans | Sept. 23, 1924 |
| 2,124,724 | Whitcomb | July 26, 1934 |
| 2,612,137 | Fuls | Sept. 30, 1952 |